(12) United States Patent
Viassolo

(10) Patent No.: US 6,993,400 B2
(45) Date of Patent: Jan. 31, 2006

(54) SYSTEM AND METHOD FOR REAL-TIME ASSIGNMENT OF JOBS TO PRODUCTION CELLS

(75) Inventor: Daniel E. Viassolo, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 213 days.

(21) Appl. No.: 10/384,870

(22) Filed: Mar. 7, 2003

(65) Prior Publication Data

US 2004/0187113 A1 Sep. 23, 2004

(51) Int. Cl.
*G06F 19/00* (2006.01)
(52) U.S. Cl. ......................................... 700/99; 700/103
(58) Field of Classification Search .......... 700/99–104; 705/8; 718/100, 104, 105; 414/787
See application file for complete search history.

(56) References Cited

U.S. PATENT DOCUMENTS

| | | | | |
|---|---|---|---|---|
| 5,586,021 A | * | 12/1996 | Fargher et al. | 700/100 |
| 5,765,988 A | * | 6/1998 | Guner et al. | 414/787 |
| 6,026,425 A | * | 2/2000 | Suguri et al. | 718/105 |
| 6,574,521 B2 | * | 6/2003 | Hsu | 700/99 |
| 2002/0129081 A1 | | 9/2002 | Rai et al. | |

OTHER PUBLICATIONS

Shaout, A. et al., "Job Scheduling Using Fuzzy Load Balancing In Distributed Systems," Electronics Letters, vol. 34, No. 20, pp. 1983-1985 (1998).
Zhang, R. et al., "Fuzzy Control of Queuing Systems, "IEEE Trans. On Fuzzy Systems, vol. 7, No. 1, pp. 17-26 (2000).

* cited by examiner

*Primary Examiner*—Leo Picard
*Assistant Examiner*—Steven R. Garland
(74) *Attorney, Agent, or Firm*—Nixon Peabody LLP

(57) ABSTRACT

System and method for real-time job cell-assignment using soft-computing is provided. The system includes a work-in-progress module, a load estimation module and a fuzzy inference module. Clients send jobs to the system and the system evaluates a plurality of document processing cells' capacity to process the jobs taking into consideration the cells' current workload and the cells' capacity to process the job. Specifically, the work-in-progress module determines a work-in-progress ("WIP") value for each cell that represents a current workload, and the load estimation module estimates a load value that represents how busy the cell is for jobs of a certain type. The fuzzy inference module applies the WIP and the estimated load values to a set of membership functions to associate the values with fuzzy values. The module determines merit values for the cells using the fuzzy values, and selects the cell having the largest merit value to route the job to.

27 Claims, 5 Drawing Sheets

SYSTEM AND METHOD FOR REAL-TIME ASSIGNMENT OF JOBS TO PRODUCTION CELLS

FIELD

This invention relates generally to process scheduling and, more particularly, to a method and system for scheduling document production jobs using a soft-computing approach.

BACKGROUND

Conventional print shops are organized in a manner that is functionally independent of the print jobs, the print job mix, and the total volume of print jobs passing through the system. Further, print shops typically organize their job processing resources into separate departments, each department corresponding to a particular process that is performed in completing a print job (e.g., printing department, finishing department, mailing department). When a print job arrives at a conventional print shop, the print job sequentially passes through a number of departments. Once the print job is processed by a first department, the print job is placed in a queue for the next department. The queue is sometimes in the form of a temporary storage facility. This process continues until the print job makes its way through the corresponding set of departments, and is completed.

There are a number of limitations with conventional print shops. For example, the equipment employed in conventional print shops is not well interfaced with internal computer systems. In addition, the equipment is often arranged in an inefficient layout. Typical arrangements employ machines that require operators to load/unload jobs, monitor job progress, pass jobs on to a next station, and commence a next job. In between each of the steps, each job is commonly stored in a storage area awaiting the next step. As a result, excess inventories may accumulate and add to the overall job costs. The lack of real time information concerning the contemporaneous state of the machines and the jobs leads to less efficient plant utilization, and lower productivity. Further, this lack of information does not permit jobs to be evenly distributed among available machines for load balancing thus creating more inefficiencies.

SUMMARY

A system for real-time assignment of jobs to production cells in accordance with embodiments of the present invention includes a work-in-progress system that determines for each one of a plurality of production cells a number of jobs already being processed and waiting to be processed by the production cell. A load system estimates for each production cell a capacity of the production cell to process a new job awaiting processing. Further, a cell selection system selects one of the production cells which is least busiest to process the new job based upon a set relationship between the determined number of jobs and the corresponding estimated capacity of each cell.

A method and a program storage device readable by a machine and tangibly embodying a program of instructions executable by the machine for real-time job assignment of jobs to production cells in accordance with embodiments of the present invention include determining for each one of a plurality of production cells a number of jobs already being processed and waiting to be processed by the production cell, estimating for each production cell a capacity of the production cell to process a new job awaiting processing, and selecting one of the production cells which is least busiest to process the new job based upon a set relationship between the determined number of jobs and the corresponding estimated capacity of each cell.

The embodiments of the present invention provide a system and process for assigning incoming jobs, such as documents to be printed to existing print shop production cells. A Fuzzy Logic approach is used to determine which production cell in a processing environment, such as a lean document factory, has the greatest current capacity to process the incoming jobs. Fuzzy logic provides a natural framework to accommodate inaccuracies in the decision making process stemming from computing WIP and estimating load values. The system and method in accordance with embodiments of the present invention provide a computationally lightweight, simple and efficient process for real-time job cell-assignment. Further, the system and method of the present invention can accommodate indefinite and/or subjective information where current systems are hindered by a lack of definite and/or objective information. A balanced workload among the plurality of print shop production cells is achieved by the embodiments of the present invention.

Lean document production ("LDP") or a lean document factory ("LDF") is a new paradigm for the organization and operation of print shops. The LDP concept was introduced in U.S. patent application Ser. No. 09/772,118 to Rai et al., filed Jan. 26, 2001, which is hereby incorporated by reference in its entirety. One of the several key concepts in LDP is the concept of a "production cell." In contrast to traditional print shops, print shops in the LDP paradigm organize equipment into production cells. These cells group the equipment together that is needed to autonomously manufacture the most common types of jobs the shop receives. Cellular arrangements offer a number of advantages over more traditional departmentalized arrangements, such as much smaller inventories, better workforce utilization, and lower defect rates, to name a few. In embodiments of the present invention, it is assumed that the print shop is organized in accordance with the LDP and/or LDF paradigm utilizing different production cells. Further, it is assumed that for a given job, in most cases there is always at least one cell that can autonomously manufacture it.

DETAILED DESCRIPTION

Figure 1:
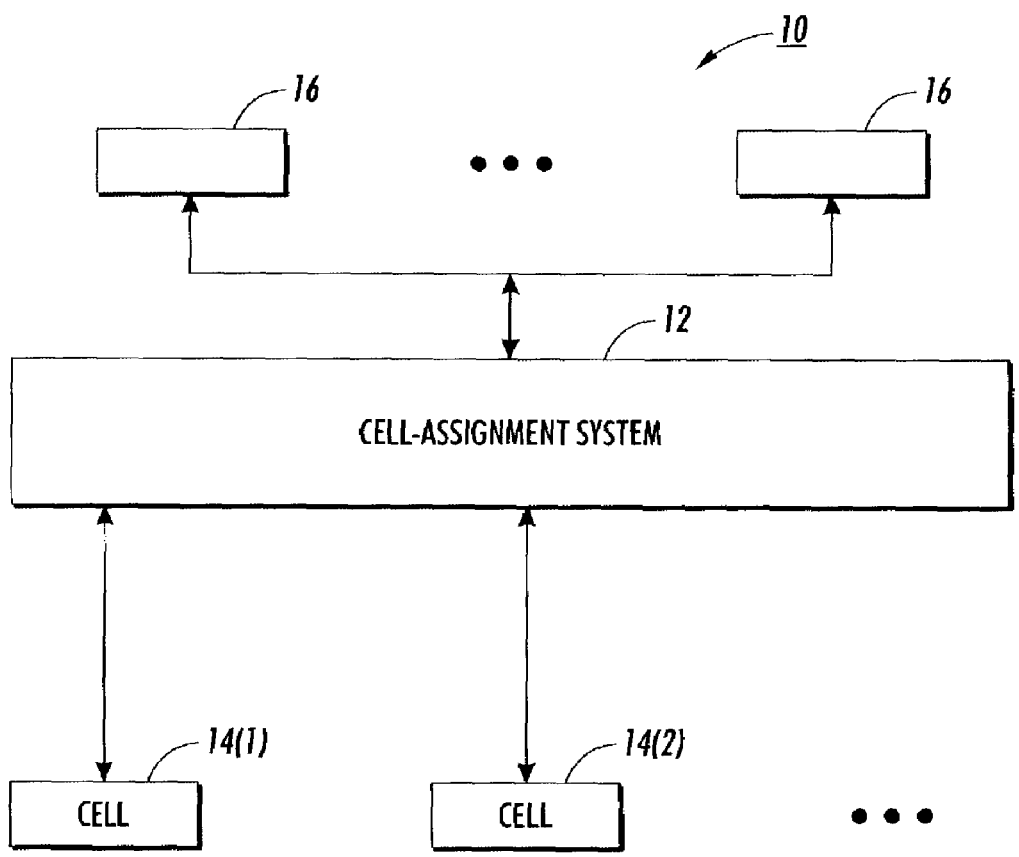
FIG. 1 is a diagram of a system for real-time job cell-assignment in accordance with embodiments of the present invention.
Figure 2:
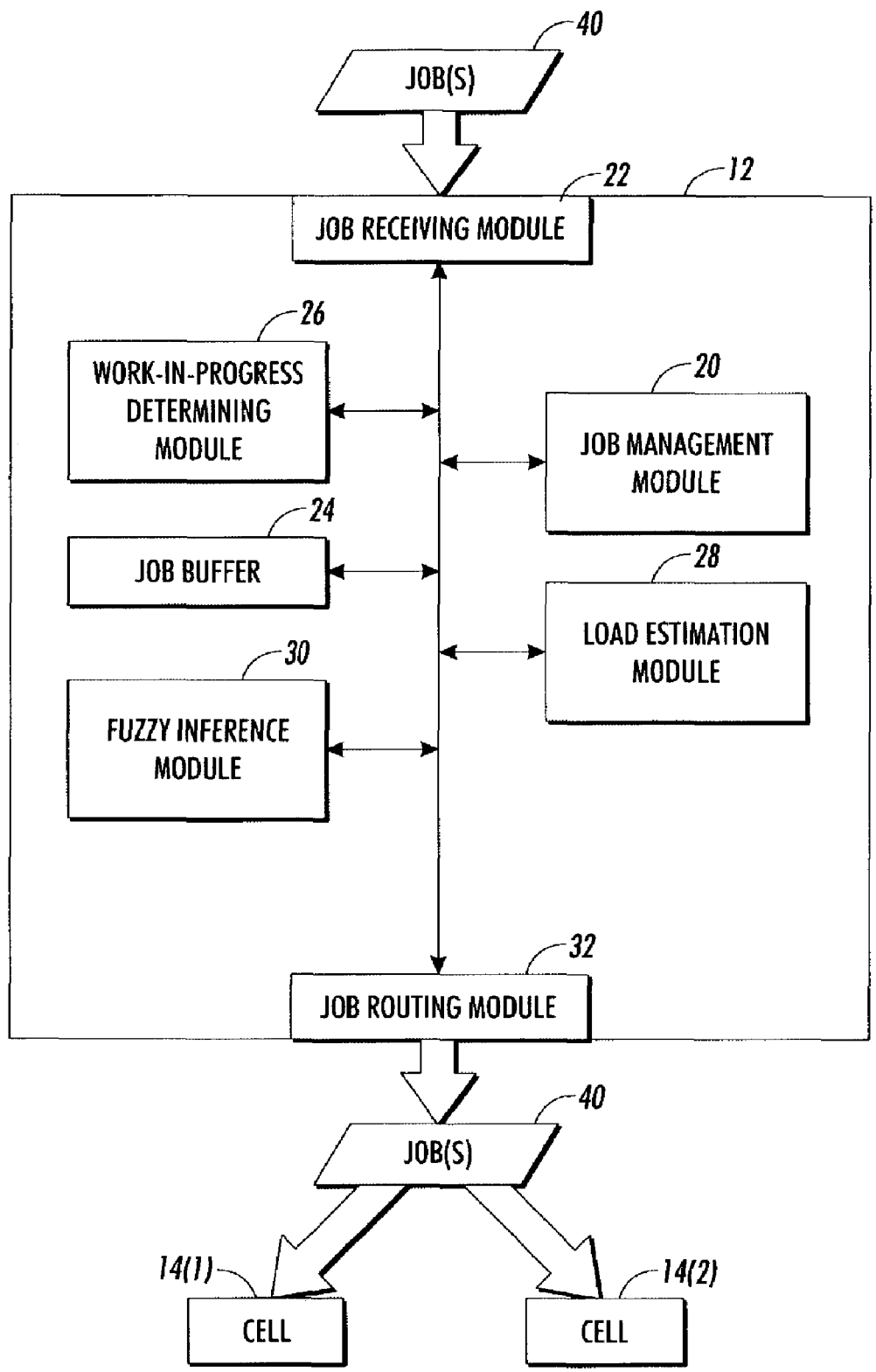
FIG. 2 is a functional block diagram of a portion of the system for real-time job cell-assignment in accordance with embodiments of the present invention.

A system 10 for real-time job cell-assignment in accordance with embodiments of the present invention is illustrated in FIGS. 1 and 2. The system 10 includes a job cell-assignment system 12, cells 14(1), 14(2) and client stations 16. The system 10 has a number of advantages, including providing a computationally lightweight, efficient and simplified process for determining an appropriate cell 14(1), 14(2) to route incoming jobs 40 to on a real-time basis. Further, the system 10 and method in accordance with embodiments of the present invention can operate using indefinite or subjective data, such as load values.

Figure 3:
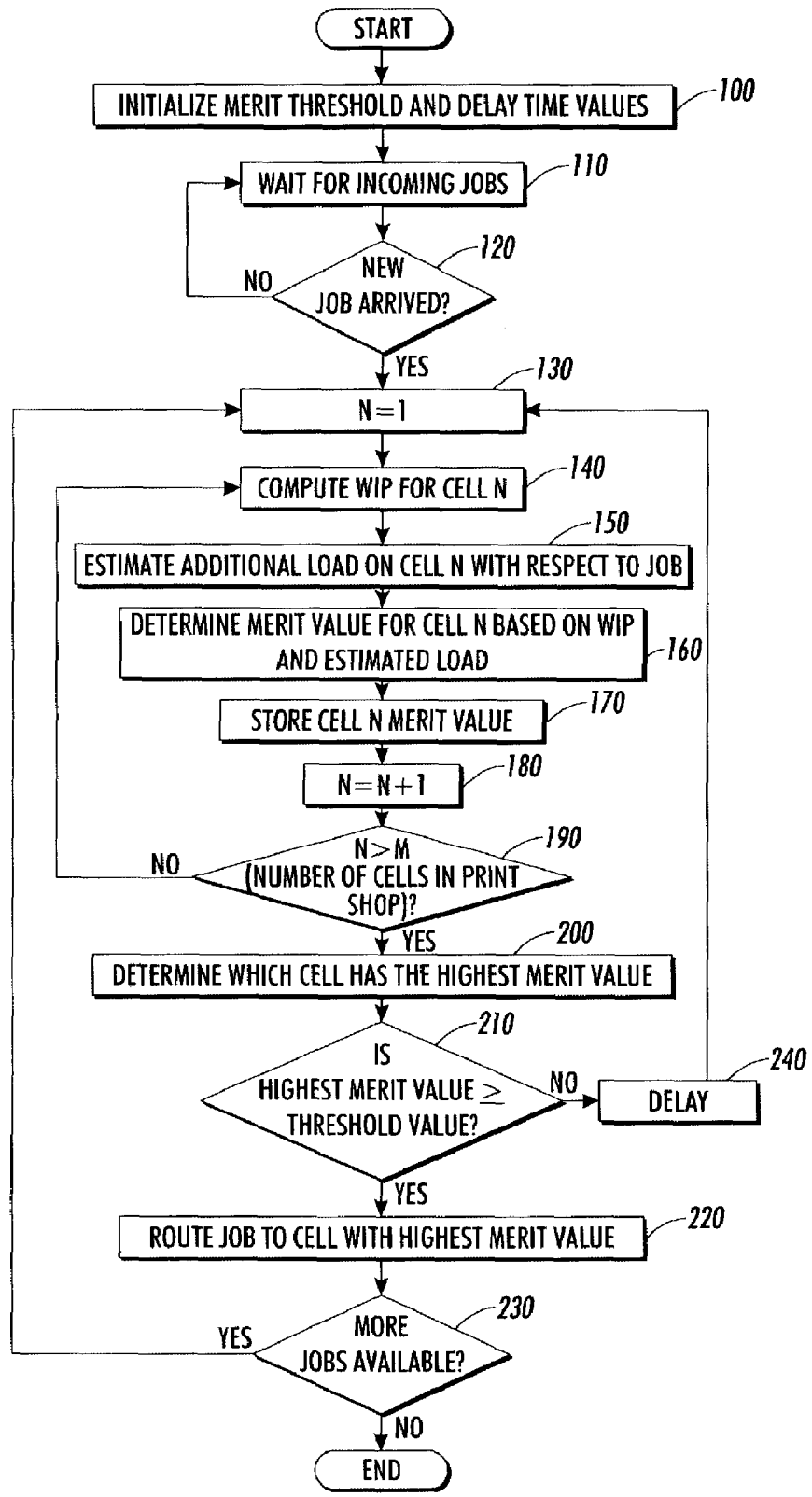
FIG. 3 is a flow chart of a process for real-time job cell-assignment in accordance with embodiments of the present invention.

Referring more specifically to FIGS. 1 and 2, the job cell-assignment system 12 includes a processor, memory and an I/O unit, which are coupled together by one or more buses, although other types and numbers of components and other coupling techniques may be used. The memory stores instructions for execution by the processor, such as for real-time job cell-assignment as shown in FIG. 3, although some or all of these instructions and data may be stored elsewhere. In embodiments of the present invention, the memory stores instructions that implement a job management module 20, job receiving module 22, job buffer 24, work-in-progress determining module 26, load estimation module 28, fuzzy inference module 30, and a job routing module 32, although the modules may comprise one or more equivalent hardware components, such as circuitry hard-wired or configured to operate in the manner described herein.

A number of programming languages may be used to configure the job cell-assignment system 12 to generate and operate these modules as described herein, such as C, C++, Pascal, Assembly language, machine language, JAVA, Smalltalk, CLOS, Ada, or Object Pascal. Furthermore, these modules are illustrated based on their function for exemplary and clarity purposes only, and do not necessarily represent specific hardware or software. The I/O unit may be connected to a network, such as the Internet or an Intranet, and has one or more ports capable of sending and/or receiving data, such as new jobs 40, from/to client stations 16 and/or cells 14 via the network.

Cells 14(1) and 14(2) each comprise a printer device that processes documents or jobs 40 of a given product-type, although the cells 14(1), 14(2) may each comprise other types and numbers of devices, as disclosed in U.S. patent application Ser. No. 09/772,118 to Rai et al., filed Jan. 26, 2001, which is hereby incorporated by reference in its entirety. Further, each cell 14(1), 14(2) may also include a logical grouping of resources, such as manpower and devices, for performing document processing. Although the system 10 is illustrated and described as just including cells 14(1) and 14(2), the system 10 may include a fewer or greater number of cells.

The client stations 16 each comprise desktop personal computers, which include a processor, memory, and an I/O unit, which are coupled together by one or more buses, although other types and numbers of components and other coupling techniques may be used. The memory stores instructions for execution by the processor, such as for generating and/or sending jobs 40 to the job cell-assignment system 12, although some or all of these instructions and data may be stored elsewhere. Further, the I/O unit may be connected to the job cell-assignment system 12 via a network, such as the Internet or an Intranet, and has one or more ports capable of receiving and/or sending data, such as jobs 40. Since work stations 16 are well known in the art, their elements, their arrangement within the stations 16 and basic operation will not be described in detail here.

The operation of the system 10 for real-time job cell-assignment in accordance with embodiments of the present invention will now be described in connection with FIGS. 3–5 and with reference back to FIGS. 1 and 2. Beginning at step 100, the job management module 20 in the job cell-assignment system 12 initializes one or more values that are utilized in the ensuing process, such as an optional merit threshold ("TH") value, an optional wait or delay time ("dT") value, and process or loop control values, such as an M value. The optional TH value is a minimum merit value that one or more of cells 14(1), 14(2) can have and be considered to be available by the job cell-assignment system 12, and the optional dT value is an amount of time that the job cell-assignment system 12 will wait before repeating steps 130–210 if none of the cells 14(1), 14(2) are considered to be available as described further in connection with step 240. By way of example only, the job cell-assignment system 12 may be configured to have an initial TH value of about 0.75 and a dT value of about 0.25 hours or about fifteen minutes, although other values may be used. The M value corresponds to the total number of cells in the system 10, such as a value of "2" for the two cells 14(1), 14(2) in this example.

At step 110, the job management module 20 is configured to initiate the job receiving module 22 to begin monitoring the I/O unit for incoming data, such as an incoming job 40 sent from a client station 16. In embodiments of the present invention, the jobs 40 received by the job cell-assignment system 12 represent electronic documents, such as word processing files, to be processed by one of the cells 14(1), 14(2), such as printing, although the jobs 40 may represent other types of digital content, such as video format files, multimedia, pictures, executable code, software or any combination thereof, where the cells are configured appropriately to process the jobs based on the content type. Also, jobs 40 may be hardcopy media, such as printed documents, which need to be copied or scanned for later printing. Further, the jobs 40 may be different sizes or have varying numbers of batches associated with each.

At decision box 120, if the job receiving module 22 detects that an incoming job 40 for processing is being received, the module 22 stores the job 40 in the job buffer 24 and the YES branch is followed. If an incoming job 40 is not detected, then the NO branch is followed and steps 110–120 are repeated until an incoming job 40 is detected, although steps 110–120 may be repeated a predetermined number of times or until a set amount of time has elapsed. In embodiments of the present invention, steps 130–230 may be performed while steps 110–120 are repeated. In such embodiments, any incoming jobs 40 that are received are stored in the job buffer 24.

At step 130, the job management module 20 initializes an N loop control value to have an initial value of "1", although other values may be used. The N value corresponds to a particular cell 14(1), 14(2) being examined by the job cell-assignment system 12 during the ensuing process. In embodiments of the present invention, an N value of "1" represents a first cell 14(11), an N value of "2" represents a second cell 14(2), and so on for each cell in the system 10, although other values can be used to represent the cells.

Further, the job management module 20 optionally develops a processing workflow for the job 40 using a workflow mapping module (not illustrated), and a job decomposition module (not illustrated) may split the job 40 into sub-jobs, as disclosed in U.S. patent application Ser. No. 09/772,118 to Rai et al., filed Jan. 26, 2001, which has already been incorporated herein by reference in its entirety. Where a job 40 is split into sub-jobs, the process for real-time job cell-assignment is performed on each sub-job in the same manner described herein with respect to a job 40. Further, a cell assignment module (not illustrated) optionally determines which one of cells 14(1), 14(2) at least has the processing capability to complete the job 40, as disclosed in U.S. patent application Ser. No. 09/772,118 to Rai et al., filed Jan. 26, 2001, which has already been incorporated herein by reference in its entirety. In this example, however, the job 40 is not split into sub-jobs, and both of cells 14(1), 14(2) are determined to have sufficient processing capabilities to be able to process the job 40 based on the job requirements, although the job cell-assignment system 12 at this point in the process has not determined how busy the cells 14(1), 14(2) are.

At step 140, the job management module 20 initiates operation of the work-in-progress determining module 26. In particular, the module 26 determines a work-in-progress ("WIP") value for the first cell 14(1). In embodiments of the present invention, the WIP value represents job "backlog" or the number of jobs currently being and/or waiting to be processed by a cell 14(1), which is stored in the memory of the job cell-assignment system 12 for each of cells 14(1), 14(2), and updated by the job management module 20 each time a job is assigned to a cell for processing and each time a job is completed. By way of example only, module 26 determines that the cell 14(1) currently has a WIP value of five jobs.

At step 150, the job management module 20 initiates operation of the load estimation module 28. In particular, the module 28 obtains a load value for the first cell 14(1) with respect to the job 40. In embodiments of the present invention, the load value represents a quantified estimate of how busy a cell is, such as the first cell 14(1), in relation to the cell's capacity to process the job 40, although the load value may represent a relationship between queue lengths of the devices and systems in the cell that would be involved in processing the job 40.

In embodiments of the present invention, the load estimation module 28 is coupled to an expert system (not illustrated) that monitors the cells 14(1), 14(2) in the system 10 and the incoming jobs 40 to estimate the load that the job 40 would impose on a cell 14(1), for example, although a skilled human operator may estimate the load on the cell 14(1) based on the operator's observations of the cell, such as accounting, for example, for a machine breakdown or maintenance, and based on the operator's experience in the shop. The estimated load value is provided to the load estimation module 28 by the expert system, although the load value may be manually input into the job cell-assignment system 12 where a skilled operator estimates the load using appropriate user interfaces, such as display devices, a keyboard and/or mouse, and the value is stored in the memory of the job cell-assignment system 12. In embodiments of the present invention, load values are in a range of between about zero and one, where values closest to zero are the most desirable load values, although other ranges and desired values may be utilized.

By way of example only, an estimated load of about 0.8 for the cell 14(1) is provided to the module 28 and stored in memory for further processing as described herein. This load value of about 0.8 may be obtained as set forth in the following example. Consider a cell 14(1) or 14(2) that contains only a black and white printer device with a printing capacity of 100 pages-per-minute. Further, assume this printer device is currently running a job 40 that requires printing 48,000 pages within the next ten hours. Since 60,000 pages are the maximum number of pages that can be printed by this device within the next ten hours, this cell would be loaded at 48,000/60,000=0.8 of its capacity. It should be appreciated that this is just one example of how such a load value could be computed using exemplary values and devices.

At step 160, the job management module 20 initiates operation of the fuzzy inference module 30 to determine a merit value for the first cell 14(1). In embodiments of the present invention, the merit value represents how busy a cell, such as cell 14(1), would be with respect to job 40, taking into account the WIP and load values for cell 14(1) as determined above in connection with steps 140 and 150.

Since cells 14(1), 14(2) in the system 10 may each have different processing capacities, fuzzy inference module 30 normalizes the stored WIP value for each cell during determination of the merit value for the cell, although the normalization may occur at other phases during the process. In particular, the module 30 normalizes the WIP values by dividing the WIP value for a cell, such as cell 14(1), by a value representing a maximum desirable WIP value for that same cell. Normalized WIP values in a range of about zero to one are most useful, although values in other ranges may be useful as well. By way of example only, a WIP value for cell 14(1) was determined above at step 140 to be about five jobs, and the maximum desirable WIP value for this cell may be about ten jobs, and thus the module 30 in this example determines that the normalized WIP value for cell 14(1) is 5÷10, which is about 0.5.

Figure 4:
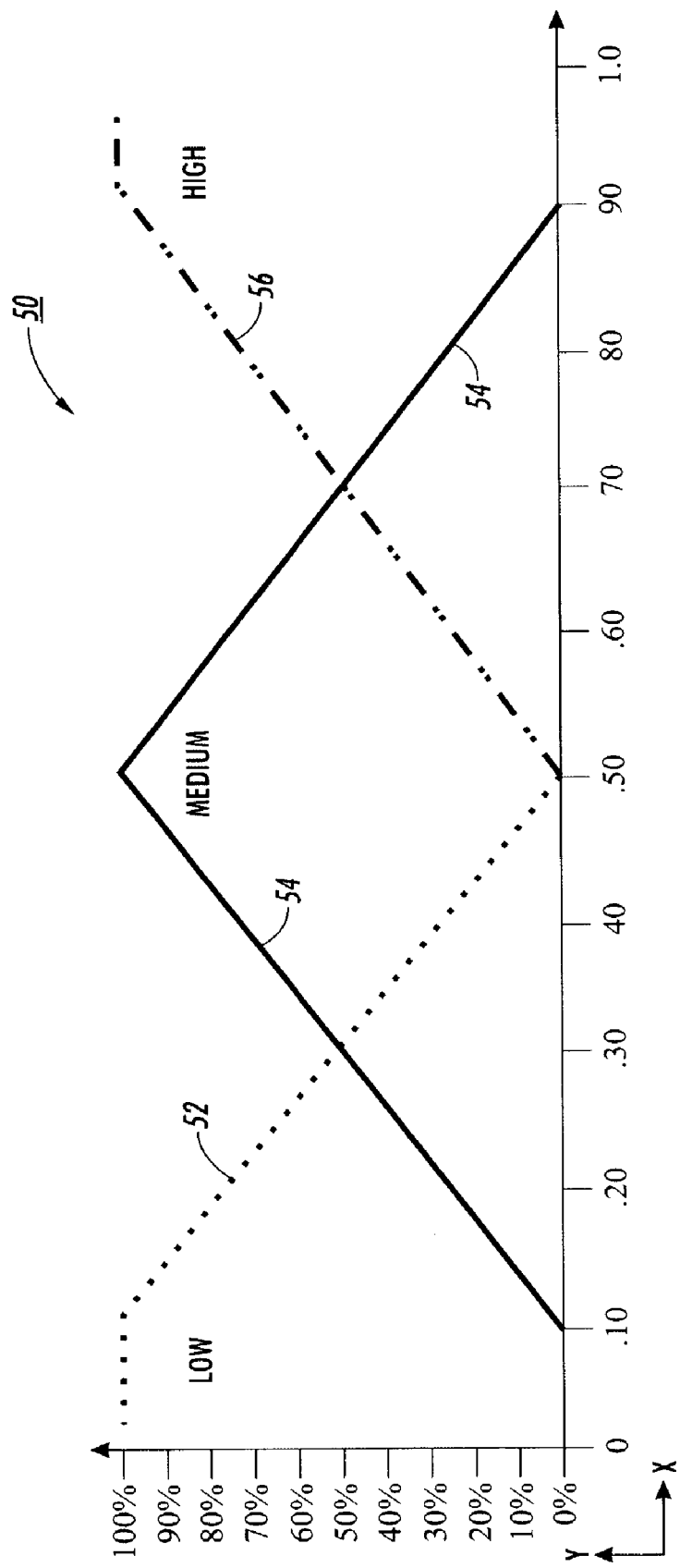
FIG. 4 is a diagram of exemplary membership functions for WIP and load values in accordance with embodiments of the present invention.

Referring to FIG. 4, the fuzzy inference module 30 accesses a set of exemplary membership functions 50 stored in the memory of the job cell-assignment system 12, which include a low level function 52, a medium level function 54 and a high level function 56. The set of exemplary membership functions 50 shown in FIG. 4 is provided for ease of description and illustrative purposes only. Further, the membership functions 50 may be adjusted or modified as desired for use in different environments and with different cells 14(1), 14(2). For example, a normalized WIP value of about 0.9, or higher, based upon the exemplary membership functions 50 provided herein, is considered to be a high WIP level, while a WIP value of about 0.5, or less, is not considered to be high at all. On the other hand, a WIP value of about 0.55 is considered to be about 10% in a high level, again, based upon the exemplary membership functions 50 provided herein that may be adjusted or modified as desired.

The module 30 uses the exemplary membership functions 50 to "fuzzify" the WIP and load values for the cell 14(1) and to determine the degree to which the WIP and load values for cell 14(1) belong to fuzzy sets associated with the WIP and load values, respectively, as described in further detail below. For instance, the exemplary WIP value of about 0.5 for cell 14(1) along the X axis of the membership functions 50 intersects the medium function 54 along the Y axis. The corresponding Y value of the medium function 54 at an X value of about 0.5 is about 100% in this example. Thus, the module 30 determines that the WIP value for the cell 14(1) belongs to a WIP fuzzy set of a 100% medium level.

As mentioned above in connection with step 150, the exemplary estimated load value for the cell 14(1) is about 0.8. The fuzzy inference module 30 applies the exemplary load value of about 0.8 for cell 14(1) to the membership functions 50, and thus the value of about 0.8 along the X axis intersects the medium function 54 and the high function 56 along the Y axis. The corresponding Y value of the medium function 54 at an X value of about 0.8 is about 30% in this example, and the corresponding Y value of the high function 56 at the X value of about 0.8 is about 70%. Thus, the module 30 determines that the load value for the cell 14(1) belongs to a load fuzzy set of a 30% medium level and a 70% high level. The fuzzy inference module 30 applies the WIP and load fuzzy sets obtained above to a set of rules stored in the memory of the job cell-assignment system 12 that can be used to determine a merit value for cells, such as cell 14(1). The rules may be expressed as a set of "if-then" statements, such as "if WIP level is . . . OR load level is . . . , then merit number is . . . ," for example.

Figure 5:
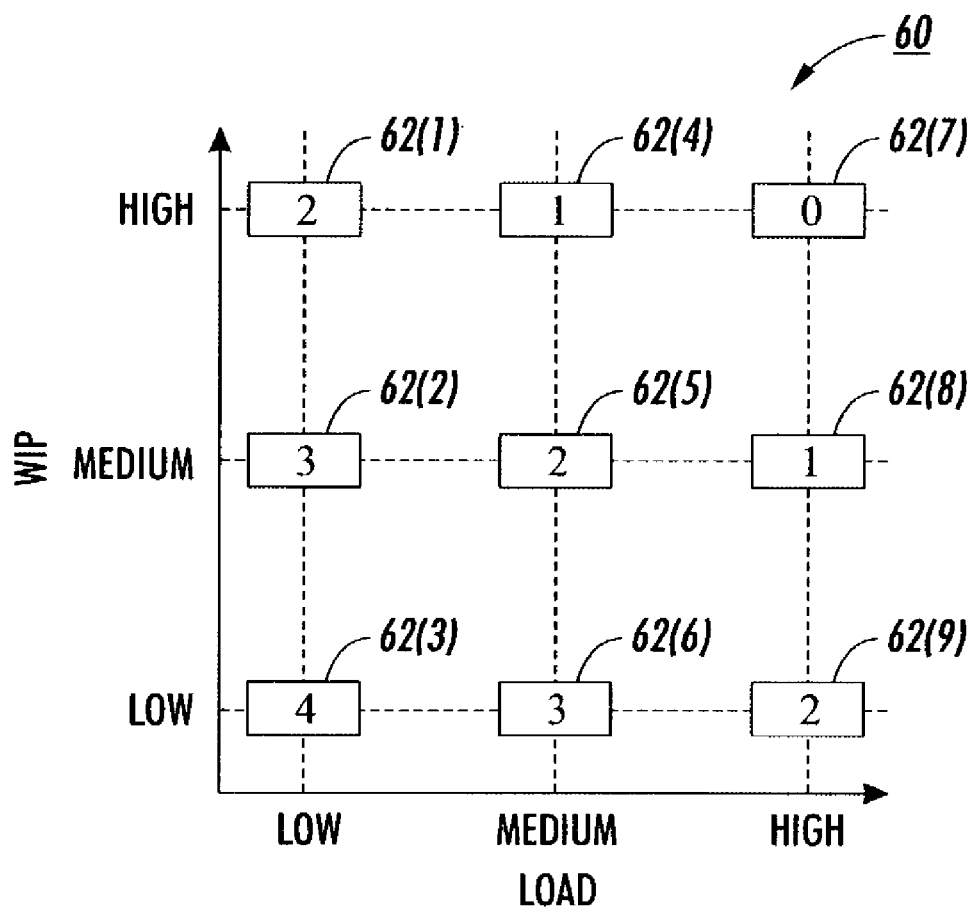
FIG. 5 is a diagram of an exemplary set of relationships between WIP, load and merit values in accordance with embodiments of the present invention.

Referring to FIG. 5, the fuzzy inference module 30 accesses an exemplary set of relationships 60 between WIP and load levels stored in the memory of the job cell-assignment system 12 to determine which of the corresponding merit value nodes 62(1)–62(9) apply, for example. The set of exemplary relationships 60 shown in FIG. 5 are provided for ease of description and illustrative purposes only. Further, the exemplary set of relationships 60 as illustrated provide a convenient way to express and summarize the rules mentioned above that may be expressed as the set of "if-then" statements, such as "if WIP level is . . . OR load level is . . . , then merit number is . . . " For example, the merit value node 62(3), which contains the number "4," would be interpreted as "if WIP level is LOW OR load level is LOW, then merit number is 4," based on the exemplary levels and merit values provided herein. Thus, the number in each of the merit value nodes 62(1)–62(9) indicate the merit value for a cell 14(1) or 14(2). In embodiments of the present invention, the higher the merit value for a cell 14(1) or 14(2), the better qualified is the cell for accepting the job 40.

The fuzzy inference module 30 applies the load and WIP fuzzy sets obtained above to the set of relationships 60, and obtains a weighted average of all the merit values that correspond to the fuzzy sets for cell 14(1) to obtain a single weighted merit value. In particular, the module 30 selects the larger of a WIP level and a load level in each pair of levels obtained using the membership functions 50, and multiplies the larger value by the corresponding merit value contained in one of the nodes 62(1)–62(9). The module 30 repeats this for each pair of WIP and load levels, adds the merit values together, and then divides the result by the number of pairs to obtain a weighted average of the merit value for a cell, such as cell 14(1).

By way of example only, the module 30 retrieves from memory the WIP and load levels obtained above for cell 14(1), such as a WIP level of 100% medium and load levels of 70% high and 30% medium, and converts them into their corresponding decimal values, such as 1.0, 0.70 and 0.30, respectively. The module 30 then obtains a merit value for a medium WIP level and a high load level, which in this example corresponds to the merit value node 62(8) having a value of "1," although the node may have other values. The corresponding WIP and load level values are 1.0 and 0.70, respectively. The module 30 selects the larger of the two values, in this example the 1.0 WIP level value, and multiplies it by the corresponding merit value of "1" to obtain a portion of the merit value for the cell 14(1), which in this case is about 1.0.

The module 30 repeats this process to obtain a merit value for the medium WIP level and a medium load level, which in this example corresponds to the merit value node 62(5) having a value of "2." The module 30 selects the larger of the two corresponding WIP and load values of 1.0 and 0.30, and multiplies the larger 1.0 WIP level value by the corresponding merit value of "2" to obtain another portion of the merit value for cell 14(1), which in this case is about 2.0. In embodiments of the present invention, the recited order in which the pairs of WIP and load values are processed above is arbitrary, as long as each pair is processed in the same manner described above. The module 30 adds the two portions of the merit value together to receive a total merit value of about 3.0, then divides the value by about "2" since there are two pairs of load and WIP levels from which the merit values are obtained to receive a weighted merit value of about 1.5 for cell 14(1).

At step 170, the fuzzy inference module 30 stores the weighted merit value determined above at step 160 for cell 14(1) in the memory of the job cell-assignment system 12 for further processing as described further herein.

At step 180, the job management module 20 increments the N loop control value by an increment value of "1" to enable the job cell-assignment system 12 to examine a next cell in the system 10, if there is a next cell, to determine the cell's weighted merit value, although other increment values may be used. In this example, the N loop control value of "1" becomes "2" after being incremented by At decision box 190, the job management module 20 compares the current N loop control value with the M loop control value initialized above at step 100 and representing the total number of cells in the system 10. If the N loop control value is greater than the M loop control value, then the YES branch is followed and all of the cells have been examined to determine their respective weighted merit values and thus there is no next cell to examine. But if the N loop control value is equal to or less than the M loop control value, then the NO branch is followed and steps 140–190 are performed until the module 20 determines that the N loop control value is greater than the M loop control value.

In this example, the N loop control value of "2" after being incremented above at step 180 is equal to the M loop control value of "2," and thus the NO branch is followed where steps 140–190 are repeated with respect to the next or second cell 14(2) as described further herein below. Accordingly, at step 140, the work-in-progress determining module 26 determines a WIP value for the second cell 14(2) in the system 10. By way of example only, module 26 determines that the cell 14(2) currently has a WIP value of about sixteen jobs. At step 150, the load estimation module 28 obtains a load value for the second cell 14(2) with respect to the job 40. By way of example only, an estimated load value of about 0.4 for the cell 14(2) is provided to the module 28 and stored in memory for further processing as described herein.

Further, at step 160, the fuzzy inference module 30 determines a merit value for the second cell 14(2) with respect to job 40, taking into account the WIP and load values for cell 14(2) as determined above in connection with steps 140 and 150. By way of example only, the WIP value for cell 14(2) determined above at step 140 was about sixteen jobs. Further, the maximum desirable WIP value for cell 14(2) in this example may be about twenty jobs, and thus the module 30 in this example determines that the normalized WIP value for cell 14(2) is 16÷20, which is about 0.8.

Referring to FIG. 4, the fuzzy inference module 30 uses the set of exemplary membership functions 50 to fuzzify the WIP and load values for the cell 14(2). In this example, the exemplary WIP value of about 0.8 for cell 14(2) along the X axis of the membership functions 50 intersects the medium function 54 and the high function 56 along the Y axis. The corresponding Y value of the medium function 54 at an X value of about 0.8 is about 30% in this example, and the corresponding Y value of the high function 56 at the X value of about 0.8 is about 70% in this example. Thus, the module 30 determines that the WIP value for the cell 14(1) belongs to a WIP fuzzy set of a 30% medium level and a 70% high level.

As mentioned above in connection with step 150, the exemplary estimated load value for the cell 14(2) is about 0.4. The fuzzy inference module 30 applies the exemplary estimated load value of about 0.4 for cell 14(2) to the membership functions 50, and thus the value of about 0.4 along the X axis intersects the low function 52 and the medium function 54 along the Y axis. The corresponding Y value of the low function 52 at an X value of about 0.4 is about 30% in this example, and the corresponding Y value of the medium function 54 at the X value of about 0.4 is about 70%. Thus, the module 30 determines that the load value for the cell 14(2) belongs to a load fuzzy set of a 30% low level and an 70% medium level.

Referring to FIG. 5, the fuzzy inference module 30 refers to the exemplary set of relationships 60 between WIP and load levels to determine which of the corresponding merit value nodes 62(1)–62(9) apply. The fuzzy inference module 30 applies the load and WIP fuzzy sets obtained above for cell 14(2) to the set of relationships 60, and obtains a weighted average of all the merit values that correspond to the fuzzy sets for cell 14(2) to obtain a single weighted merit value. In particular, the module 30 selects the larger of a WIP level and a load level in each pair of levels obtained using the membership functions 50, and multiplies the larger value by the corresponding merit value contained in one of the nodes 62(1)–62(9). Again, the module 30 repeats this process for each pair of WIP and load levels, adds the merit values together, and then divides the result by the number of pairs to obtain a weighted average of the merit value for cell 14(2).

By way of example only, the module 30 retrieves from memory the WIP and load levels obtained above for cell 14(2), such as WIP levels of 70% and 30%, and load levels of 30% and 70%, and converts them into their corresponding decimal values, such as 0.70, 0.30, 0.30, and 0.70, respectively. The module 30 then obtains a merit value for a medium WIP level and a low load level, which in this example corresponds to the merit value node 62(2) having a value of "3," although the node may have other values. The corresponding WIP and load level values are 0.30 and 0.30, respectively. The module 30 selects the larger of the two values or either value where they are substantially equal, in this example the 0.30 WIP or load level value, and multiplies it by the corresponding merit value of "3" to obtain a first portion of the merit value for the cell 14(2), which in this case is about 0.9.

The module 30 obtains a merit value for the medium WIP level and the medium load level, which in this example corresponds to the merit value node 62(5) having a value of "2." The module 30 selects the larger of the two corresponding WIP and load values of 0.30 and 0.70, and multiplies the larger 0.70 load level value by the corresponding merit value of "2" to obtain a second portion of the merit value for cell 14(2), which in this case is about 1.4. The module 30 obtains a merit value for the high WIP level and the low load level, which in this example corresponds to the merit value node 62(1) having a value of "2." The module 30 then selects the larger of the two corresponding WIP and load values of 0.70 and 0.30, and multiplies the larger 0.70 WIP level value by the corresponding merit value of "2" to obtain a third portion of the merit value for cell 14(2), which in this case is about 1.4. The module 30 next obtains a merit value for the high WIP level and the medium load level, which in this example corresponds to the merit value node 62(4) having a value of "1." The corresponding WIP and load level values are 0.70 and 0.70, respectively. The module 30 subsequently selects the larger of the two values or either value where they are substantially equal, in this example the WIP or load level value of 0.70, and multiplies it by the corresponding merit value of "1" to obtain a fourth portion of the merit value for cell 14(2), which in this case is about 0.70.

In embodiments of the present invention, the recited order in which the pairs of WIP and load values are processed as described above is arbitrary, as long as each pair is processed in the same manner described above. The module 30 adds all the portions of the merit value for cell 14(2) together (i.e., 0.9+1.4+1.4+0.70) to receive a total merit value of about 4.40, then divides the value by 4 since there are four pairs of load and WIP levels from which the merit values are obtained to receive a single weighted merit value of about 1.1 for cell 14(2), which is stored in the memory of the job cell-assignment system 12 at step 170 for further processing as described further herein. At step 180, the job management module 20 increments the N loop control value by an increment of "1." In this example, the N loop control value of "2" becomes "3" after being incremented. At decision box 190, the job management module 20 compares the current N loop control value with the M loop control value and determines that the N loop control value of "3" is greater than the M loop control value of "2," and the YES branch is followed.

At step 200, the job management module 20 determines which one of the cells 14(1), 14(2) has the highest weighted merit value. If cells 14(1), 14(2) in system 10 have substantially equal weighted merit values, the module 20 randomly selects a merit value of one of the cells having the same or about the same value, although steps 130–200, and optionally step 240 as described further herein, may be repeated until the module 20 determines that only one of the cells in the system 10 has the highest weighted merit value. In this example, since the cell 14(1) has a merit value of about 1.5 and cell 14(2) has a merit value of about 1.1, the module 20 determines that cell 14(1) has the highest merit value.

At decision box 210, the job management module 20 optionally compares the highest weighted merit value of the cells 14(1), 14(2) determined above at step 200 with the optional TH value initialized above at step 100. Again, the TH value is the minimum value that one or more of cells 14(1), 14(2) can have and be considered to be available by the job cell-assignment system 12. If the module 20 determines that the highest weighted merit value for the cells 14(1), 14(2) is substantially equal or greater than the TH value, then the YES branch is followed. But if the module 20 determines that the highest merit value is less than the TH value, then the NO branch is followed. In this example, since the highest merit value of about 1.5 from cell 14(1) is greater than the TH value of 0.75, the YES branch is followed and step 220 is performed as described further herein below.

At step 220, the job routing module 32 retrieves the job 40 from the job buffer 24, and sends the job 40, along with location information of one of the cells 14(1), 14(2) where the job should be routed to, such as a network address or Internet address, to the I/O unit of the job cell-assignment system 12. The location information identifies one of the cells 14(1), 14(2) determined to have the highest merit value, and optionally the cell with the highest merit value that is substantially equal to or greater than the TH value. The I/O unit routes the job 40 to the identified cell 14(1) or 14(2). In this example, the module 32 sends the job 40 to the I/O unit for routing to cell 14(1).

At decision box 230, the job management module 20 checks the job buffer 24 to determine whether there are one or more other jobs 40 present. If there are one or more jobs 40 in the buffer 24, then the YES branch is followed and steps 130–240 are performed as described herein. But if there are no jobs 40 in the buffer 24, then the NO branch is followed and the process ends, although again, steps 110–120 may continue to be performed until a new job 40 is received by the job cell-assignment system 12.

If at decision box 210 the module 20 determines that the highest merit value from one of the cells 14(1), 14(2) is less than the TH value, then the NO branch is followed and step 240 is performed as described herein, although the process may skip step 240 and proceed to step 130. At step 240, the module 20 causes a substantial portion of the operation of the job cell-assignment system 12 as described herein to be halted or suspended an amount of time substantially equal to the dT value initialized above for the job cell-assignment system 12 at step 100. Again, the dT value is an amount of time that the job cell-assignment system 12 will wait before repeating steps 130–240 if none of the cells 14(1), 14(2) are considered to be available. In this example, the module 20 waits for 0.25 hours or fifteen minutes before repeating steps 130–240.

In embodiments of the present invention, the exemplary WIP and load values provided above, the set of exemplary membership functions 50, and the set of exemplary relationships 60 shown in FIGS. 4 and 5, respectively, are provided for ease of description and illustrative purposes only, and should not be construed to limit the embodiments of the present invention. Further, the particular functions 50 and relationships 60 will depend on the processing capabilities of the cells 14(1), 14(2) and the types of jobs 40 involved in the system 10. The use of these exemplary functions 50 and relationships 60 in conjunction with the process for real-time job cell-assignment as disclosed herein in accordance with embodiments of the present invention assist the job cell-assignment system 12 in dealing with imprecise data, such as the load values, in an efficient manner.

The system 10 in accordance with embodiments of the present invention includes a job cell-assignment system 12 that employs a computationally lightweight, efficient and simplified process for job cell-assignment utilizing fuzzy logic and indefinite or subjective data, such as load values, as well as other data, such as WIP values, to enable determination of an appropriate cell 14(1), 14(2) for routing incoming jobs 40 to. Further, the system 10 determines which of cells 14(1), 14(2) are the appropriate cell to route incoming jobs 40 to by estimating which cell has the greatest capacity to process the job while considering the cells' current workload or backlog. Fuzzy logic provides a natural framework to accommodate inaccuracies in the decision making process stemming from computing WIP and estimating load values. As a result of the computationally lightweight processes utilized by the job cell-assignment system 12, jobs 40 can be routed to the appropriate cells 14(1), 14(2) on a real-time basis to achieve a balanced workload among the cells 14(1), 14(2) in system 10.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method comprising:
   determining for each one of a plurality of production cells a number of jobs already being processed and waiting to be processed by the production cell;
   estimating for each of the production cells a capacity of the production cell to process a new job awaiting processing; and
   selecting one of the production cells that is least busy to process the new job based upon the determined number of jobs and the corresponding estimated capacity of each cell using a fuzzy logic algorithm.

2. The method as set forth in claim 1 further comprising routing the new job to the selected least busiest production cell.

3. The method as set forth in claim 1 further comprising performing the determining, estimating and selecting for another new job awaiting processing.

4. The method as set forth in claim 1, wherein the fuzzy logic algorithm comprises associating the determined number of jobs with at least one first fuzzy value and the corresponding estimated capacity with at least one second fuzzy value using a set of membership functions.

5. The method as set forth in claim 4 further comprising:
   matching each of the at least one first fuzzy value with each of the at least one second fuzzy value to obtain a merit number for each pair of the first fuzzy value and the second fuzzy value;
   selecting one of the first fuzzy value and the second fuzzy value in each pair which has a greater value to obtain a selected fuzzy value for the pair; and
   multiplying the merit number of each pair by the selected fuzzy value of the pair to obtain a fuzzified merit value for the pair.

6. The method as set forth in claim 5 further comprising:
   adding a plurality of fuzzified merit values together to receive a total merit value; and
   dividing the total merit value by a total number of pairs of the first fuzzy value and the second fuzzy value to attain a weighted merit value.

7. The method as set forth in claim 6 further comprising deselecting the selected production cell and repeating the determining, the estimating, and the selecting for the new job if the total merit value is substantially less than a minimum merit threshold value.

8. The method as set forth in claim 7 further comprising waiting a set period of time before performing the repeating.

9. The method as set forth in claim 1 wherein the estimating a capacity to process a new job further comprises evaluating a queue length of at least one job processing component associated with each production cell that is needed to process the new job.

10. A computer-readable medium having stored thereon instructions, which when executed by at least one processor, causes the processor to perform:
    determining for each one of a plurality of production cells a number of jobs already being processed and waiting to be processed by the production cell;
    estimating for each of the production cells a capacity of the production cell to process a new job awaiting processing; and
    selecting one of the production cells that is least busy to process the new job based upon the determined number of jobs and the corresponding estimated capacity of each cell using a fuzzy logic algorithm.

11. The medium as set forth in claim 10 further comprising routing the new job to the selected least busiest production cell.

12. The medium as set forth in claim 10 further comprising performing the determining, estimating and selecting for another new job awaiting processing.

13. The medium as set forth in claim 10, wherein the fuzzy logic algorithm comprises associating the determined number of jobs with at least one first fuzzy value and the corresponding estimated capacity with at least one second fuzzy value using a set of membership functions.

14. The medium as set forth in claim 13 further comprising:
matching each of the at least one first fuzzy value with each of the at least one second fuzzy value to obtain a merit number for each pair of the first fuzzy value and the second fuzzy value;
selecting one of the first fuzzy value and the second fuzzy value in each pair which has a greater value to obtain a selected fuzzy value for the pair; and
multiplying the merit number of each pair by the selected fuzzy value of the pair to obtain a fuzzified merit value for the pair.

15. The medium as set forth in claim 14 further comprising:
adding a plurality of fuzzified merit values together to receive a total merit value; and
dividing the total merit value by a total number of pairs of the first fuzzy value and the second fuzzy value to attain a weighted merit value.

16. The medium as set forth in claim 15 further comprising deselecting the selected production cell and repeating the determining, the estimating, and the selecting for the new job if the total merit value is substantially less than a minimum merit threshold value.

17. The medium as set forth in claim 16 further comprising waiting a set period of time before performing the repeating.

18. The medium as set forth in claim 10 wherein the estimating a capacity to process a new job further comprises evaluating a queue length of at least one job processing component associated with each production cell that is needed to process the new job.

19. A system comprising:
a work-in-progress system that determines for each one of a plurality of production cells a number of jobs already being processed and waiting to be processed by the production cell;
a load system that estimates for each of the production cells a capacity of the production cell to process a new job awaiting processing; and
a cell selection system including a fuzzy inference system that selects one of the production cells that is least busy to process the new job based upon the determined number of jobs and the corresponding estimated capacity of each cell.

20. The system as set forth in claim 19 further comprising a job routing system that routes the new job to the selected least busiest production cell.

21. The system as set forth in claim 19 wherein the system causes operation of the work-in-progress system, the load system and the cell selection system for another new job awaiting processing.

22. The system as set forth in claim 19 wherein the fuzzy inference system associates the determined number of jobs with at least one first fuzzy value and the corresponding estimated capacity with at least one second fuzzy value using a set of membership functions.

23. The system as set forth in claim 22 wherein the fuzzy inference system matches each of the at least one first fuzzy value with each of the at least one second fuzzy value to obtain a merit number for each pair of the first fuzzy value and the second fuzzy value, selects one of the first fuzzy value and the second fuzzy value in each pair which has a greater value to obtain a selected fuzzy value for the pair, and multiplies the merit number of each pair by the selected fuzzy value of the pair to obtain a fuzzified merit value for the pair.

24. The system as set forth in claim 23 wherein the fuzzy inference system adds a plurality of fuzzified merit values together to receive a total merit value and divides the total merit value by a total number of pairs of the first fuzzy value and the second fuzzy value to attain a weighted merit value.

25. The system as set forth in claim 24 wherein the cell selection system deselects the selected production cell and repeats operation of the work-in-progress system, the load system and the cell selection system for the new job if the weighted merit value is substantially less than a minimum merit threshold value.

26. The system as set forth in claim 25 wherein the cell selection system waits a set period of time before repeating the operation of the work-in-progress system, the load system and the cell selection system.

27. The system as set forth in claim 19 wherein the load system estimates the capacity to process the new job by evaluating a queue length of at least one job processing component associated with each production cell that is needed to process the new job.

* * * * *